United States Patent [19]

Voss

[11] 4,316,813

[45] Feb. 23, 1982

[54] LIMESTONE-BASED SORBENT AGGLOMERATES FOR REMOVAL OF SULFUR COMPOUNDS IN HOT GASES AND METHOD OF MAKING

[75] Inventor: Kenneth E. Voss, Somerville, N.J.

[73] Assignee: Engelhard Minerals & Chemicals Corp., Edison, N.J.

[21] Appl. No.: 175,227

[22] Filed: Aug. 4, 1980

[51] Int. Cl.$^3$ .......................... B01D 53/12; B01J 8/24
[52] U.S. Cl. .................................. 252/189; 252/443; 55/73; 423/220; 423/242; 423/244
[58] Field of Search .................... 252/189, 443; 55/73; 423/242, 244, 220

[56] References Cited

U.S. PATENT DOCUMENTS

| | | | |
|---|---|---|---|
| 3,976,747 | 8/1976 | Shale et al. | 252/189 |
| 4,108,969 | 8/1978 | Merkl | 252/189 |
| 4,115,518 | 9/1978 | Delmon | 252/189 |
| 4,177,158 | 4/1979 | Blue | 252/189 |

OTHER PUBLICATIONS

Gasner et al., "Limestone Utilization Optimization in Fluidized Bed Boilers", Pro. of the Fifth Int. Conf., vol. II, Mitre Corp., 1978, (pp. 762–772).

*Primary Examiner*—Benjamin R. Padgett
*Assistant Examiner*—Irwin Gluck
*Attorney, Agent, or Firm*—Inez L. Moselle

[57] ABSTRACT

Sulfur-containing compounds such as hydrogen sulfide and sulfur oxides arising from gasification or combustion of organic fuels such as coal may be removed from the hot gases by attrition resistant, highly reactive limestone-based sorbent agglomerates. The agglomerates are formed by crushing and powdering naturally occurring limestone into grains of fine particle size and binding the powdered limestone grains with a binder that is stable at high temperature, for example a colloidal grade of attapulgite clay. Volatile liquid is added to the mix of binder and powdered limestone to form a paste-like mixture, which is then agglomerated in compression-type agglomerating equipment to form spheroidal agglomerates having good green strength. In fluidized bed combustion applications, these agglomerates have attrition resistance equivalent to conventional natural limestone granules and are far more reactive in terms of sulfur pickup.

10 Claims, No Drawings

LIMESTONE-BASED SORBENT AGGLOMERATES FOR REMOVAL OF SULFUR COMPOUNDS IN HOT GASES AND METHOD OF MAKING

BACKGROUND OF THE INVENTION

1. Field of the Invention

This invention relates to novel, composite agglomerated limestone particles useful for absorbing sulfur oxides ($SO_2$ and $SO_3$) or hydrogen sulfide from hot gases arising from combustion, gasification or other chemical reaction of coal or other organic fuels. More particularly, this invention relates to a method of making such agglomerates such that resistance to attrition is equivalent to conventionally used natural limestone granules.

2. Description of the Prior Art

A wide variety of methods are currently employed to remove sulfur compounds from gaseous streams. Hydrogen sulfide, arising for example from coal gasification operations, is removed to purify reducing gases for other uses downstream, such as further chemical reaction. Sulfur oxides and hydrogen sulfides when present must be removed from exhaust gases to maintain environmental air quality. Sulfur oxides arise from burning carbonaceous, sulfur-bearing fuels such as coal or heavy oil. It has long been known that the calcium in limestone and the calcium and magnesium in dolomite are effective sulfur capturing agents. The stone may be pre-calcined to convert the calcium or magnesium carbonate to the oxide, which reacts with sulfur compounds to produce in the first instance, calcium sulfide from hydrogen sulfide gas, or in the second instance, calcium sulfate from sulfur oxides and oxygen. High temperature is generally required for the reactions in the dry state and the calcination reaction (release of $CO_2$) may take place simultaneously with the absorption reaction. Wet scrubbing methods may be used effectively to remove sulfur compounds in gases at lower temperature.

Limestone sorbents for sulfur oxide find particular application in the fluidized bed combustor, which is a promising technology for more efficient industrial steam generation or electrical power generation. The limestone is used in the form of crushed granules, irregular in shape and about ¼ inch in size. The limestone granules are mixed directly in the fluidized bed with pulverized coal of similar shape and size or a heavy oil spray. An upward flow of air supplies oxygen for burning the fuel and fluidizing the bed. Sulfur contained in the fuel is oxidized and subsequently absorbed by the limestone in a high temperature, dry-state reaction. Spent sorbent and ash are removed from the bed continuously as fresh limestone and fuel are added. Reference is made to the following two articles explaining the state of the art in this technology: C. S. R. Rao, "FLUIDIZED BED COMBUSTION TECHNOLOGY—A Review," Combustion Science and Technology, vol. 16 215-227 (1977); and J. E. Mesko, "COAL COMBUSTION IN A LIMESTONE BED," Chemical Engineering Progress, vol. 74, no. 8, pages 99-102 (1978).

One of the major problems associated with the operation of these fluidized bed combustors (FBC's) is the excess limestone required to meet current EPA air pollution standards for sulfur oxide emissions. Depending upon the reactivity of the limestone, at least three times the stoichiometric amount (Ca/S ratio of 1) may be required for 85% $SO_2$ removal. Reference is made to EPRI Final Report, Project 721-1 "CRITERIA FOR THE SELECTION OF $SO_2$ SORBENTS FOR ATMOSPHERIC PRESSURE FLUIDIZED-BED COMBUSTORS," EPRI FP-1307, Vol. 1, December, 1979, published by Westinghouse Electric Corp., Pittsburgh, Pa. Proposed stricter standards for sulfur oxide ($SO_x$) levels will lead to even higher Ca/S ratios. This large sorbent requirement has a significant effect on FBC-boiler plant cost and performance. The spent sorbent generally contains only a relatively small portion (about 30% or less) of the total available calcium converted to calcium sulfate. The remaining calcium exists mostly as calcium oxide with small amounts of calcium carbonate. The loss in reactivity is attributed to calcium sulfate product plugging the pores of the calcined limestone so that further reaction cannot continue. Thus the majority of potential sorbent value remains unused. For these reasons enhanced reactivity and improved calcium utilization would be highly desirable for reducing the Ca/S ratio.

Several methods for enhancing the reactivity of limestone granules have been investigated in the past. Reference is made to L. L. Gasner and S. E. Setesak, "LIMESTONE UTILIZATION OPTIMIZATION IN FLUIDIZED BED BOILERS," Proceedings of the Fifth International Conference on Fluidized Bed Combustion, Vol. II, Mitre Corp., 1978 (pages 762-772). The conference at which this report was originally presented was held in December 1977 in Washington, D. C. These authors discuss three favored methods of reactivity enhancement; salt (sodium chloride) addition, slow precalcination in an atmosphere rich in carbon dioxide, and reduction of the limestone to particles finer than −325 mesh Tyler. All three methods have serious drawbacks, and the authors conclude the best way of increasing reactivity is to agglomerate finely powdered limestone. Gasner et al, supra, propose a process in which spent limestone agglomerated with fly ash would be used as a recycle with unreformed limestone granules as fresh feed. A classification step would separate the two after their time in the reactor. It is not known that agglomerates so formed could withstand the conditions of combustion in a fluidized bed, or whether fly ash is used as a binder or sorbent. In a general desulfurization application U.S. Pat. No. 4,061,716 to McGauley makes fleeting reference to an agglomerated calcium-bearing sorbent such as limestone, lime or dolomite, bound with a water-soluble and reversibly hydratable compound such as calcium sulfate or calcium hydroxide. The patent contains no examples illustrating the production of calcium-based sorbents, and there is no indication that sorbents disclosed by McGauley, supra would possess the required heat stability or would give the required resistance to attrition for fluidized bed use.

Other examples of limestone agglomerates for desulfurization of gases are disclosed by Netherlands application No. 76/03,614 published Oct. 11, 1977 on application No. 76/3,614 published Apr. 7, 1976, assigned to Firma Hermann Wegner (CHEMICAL ABSTRACTS 89; 48340a). Limestone is first burned (heated to 400° C.) before being impregnated with a binder such as sodium silicate or sodium borate in solution. The mixture is then pelletized. German Offenlegung No. 2,548,845 to Dolmon et al published May 13, 1976 with a French application No. 74/36,862 published Nov. 6, 1974 (CHEMICAL ABSTRACTS 85; 129864u) discloses the use of halide salts such as calcium chloride, potassium chloride or calcium bromide to bind calcium carbonate powders, and sulfuric acid to bind magnesium compounds (oxide, hydroxide, carbonate) to form pelletized sorbents for desulfurization of gases.

Another example of agglomerated calciferous material is one suggested for absorbing sulfur dioxide from automobile exhaust gas disclosed in U.S. Pat. No. 4,061,593 to Summers. Calcium hydroxide is pelletized with sodium silicate as a binder. The mixture is pelletized in a Dorst compacting press. The cylindrically-shaped pellet is then partially calcined in a $CO_2$ environment to convert part of the CaO to $CaCO_3$. The carbonate and silicate form a rigid matrix within the particle so that the particle does not swell appreciably when reacting with sulfur dioxide and has sufficient crush strength to allow transportation without deterioration.

Still other examples of agglomerated limestone particles containing binders have been suggested for use in agriculture and ceramics. Reference is made to Perrine (U.S. Pat. No. 4,015,973) which discloses the use of a swelling, i.e., sodium, bentonite as a binder for crushed limestone to produce pelletized granules useful primarily as soil conditioners. Binder is present in amounts ranging from 1 to 10% based on total weight, and water is added during the pelletizing step. A pan agglomerator is preferred, since more uniform pellets allegedly result from its use over mixer or drum agglomerators. U.S. Pat. No. 3,615,811 to Barrett discloses alkali metal silicates, bentonite, and various organic compounds as binders for alkaline earth carbonate particles useful in ceramics. Binder is present in amounts up to 5% based on total weight. The particles are formed by slurrying the ingredients and spray drying.

Like the bentonites, attapulgite clay is widely known and used as a binder for various materials. A zeolite agglomerate bound with 3–6% attapulgite clay based on total weight of the particle is disclosed in U.S. Pat. No. 3,287,281 to Haden et al. U.S. Pat. No. 2,831,818 discloses bone meal bound with about 20% attapulgite and 6% starch (dry weight basis). U.S. Pat. No. 3,098,045 to Allegrini et al discloses bauxite aggregates bound with up to about 15% attapulgite clay.

SUMMARY OF THE INVENTION

The object of the present invention is to produce limestone-based sorbent agglomerates useful for removal of sulfur compounds, for example $H_2S$ and $SO_x$, from hot gases. Another object of the invention is to produce agglomerates with greatly enhanced sulfur removal capacity and reactivity over that exhibited by natural limestone granules from which the agglomerates are made. Still another object of the present invention is a method of making these agglomerates with attrition resistance equivalent to natural limestone granules presently used for sulfur removal in fluidized bed combustion. To my knowledge no prior art process has succeeded in producing agglomerates or pellets that are sufficiently resistant to attrition in FBC use. Still other objects and advantages of my invention will become readily apparent to those skilled in the art by the following description and examples.

I have discovered that heat-stable, attrition resistant, sulfur sorbent agglomerates having dramatically increased reactivity can be made by pulverizing limestone into fine grains of powder and agglomerating the grains with a binder that is stable at high temperature using compression-type agglomerating equipment which generates shearing, squeezing, densifying and compacting forces. The substantially spheroidal agglomerates so produced are generally significantly more resistant to attrition than agglomerates of the same composition prepared by conventional extrusion technology or agitation-type agglomerators such as disc or drum pelletizers.

A most important characteristic of the binder is high temperature stability. The binder must not decompose or lose its binding power at temperatures in the range 800°–1000° C. Many, generally inorganic, compounds of widely diverse character may be employed, although all may not prove equally effective.

In a preferred method of manufacture the sorbent particles are prepared by dry-blending powered limestone and cementitious binder also in powdered state or condition, mixing with sufficient volatile liquid to obtain a paste-like mixture, and agglomerating the mixture in a pin-mixer agglomerator. It is also recognized that the binder may be added to the powdered limestone in solution or suspension form, the binder having been dissolved, suspended or made in the liquid. When made according to the method of the present invention limestone agglomerates with suitable binders exhibit resistance to attrition equivalent to the harder natural limestone granules presently employed in FBC applications.

In laboratory experiments described hereinafter agglomerates of the present invention have greatly enhanced reactivity over the crushed, natural limestone granules presently used. Agglomerates of the present invention also have the capacity to completely absorb all the sulfur oxides in a hot gas stream for periods up to ten times longer than the crushed, natural limestone presently used, as determined in a laboratory test described hereinafter.

Agglomerates of the present invention have the additional important benefit of reducing the dependence of sorption effectiveness on the source of the limestone. Therefore, the sorbent agglomerates of the present invention can be made from a wide variety of limestones, without substantial sacrifice of reactivity or attrition resistance.

The major contemplated use of the agglomerates of the present invention is sulfur capture in fluidized bed combustion units. However, it would be recognized by those skilled in the art that agglomerates of the present invention may be useful in any sulfur oxide sorption operation in which crushed, natural limestone granules are presently being used. Also, agglomerates of the present invention should perform well in removing hydrogen sulfide from hot gases, such as those generated in coal gasification or the like. In addition, it may be possible to use the agglomerates of the present invention regenerative cycles, in which sulfur compounds are removed from the agglomerates by oxidation of the sulfide or reduction of the sulfate, and agglomerates so regenerated may be recycled to absorb more sulfur compounds.

DESCRIPTION OF THE PREFERRED EMBODIMENTS

Agglomerates of the present invention may be made from crushed, granular limestone (hereinafter referred to as unreformed, natural limestone granules) from any source. Exemplary among these limestones may be Chemstone, which has a typical chemical analysis of about 54.7% CaO, 0.6% MgO, 0.4% $SiO_2$, 0.2% $Al_2O_3$, 0.1% $Fe_2O_3$ and 43.1% L.O.I (loss on ignition generally attributed to $CO_2$ and trace amounts of other volatile matter). Examples of other limestones which may be used are Greer, which has a typical chemical analysis of about 46.3% CaO, 1.4% MgO, 9.0% SiO$_2$, 2.7% Al$_2$O$_3$, 1.0% Fe$_2$O$_3$ and 37.7% L.O.I., and Grove, which has a typical chemical analysis of 56.9% CaO, 0.7% SiO$_2$, 0.2% Al$_2$O$_3$, 0.1% Fe$_2$O$_3$ and 43.5% L.O.I. Natural limestones having high reactivity are preferred, but low reactivity limestones, when reformed into agglomerates according to the present invention, show such an improvement in sulfur pickup as to make them virtually equal in performance to agglomerates made with the more reactive stones. The granules are first ground to powder, for example 75% finer than 325 mesh and 100% finer than 200 mesh Tyler. All particle sizes reported hereinafter are according to Tyler scale. The powdered limestone is then dry-mixed with particles of cementitious binder material. The preferred binder is a colloidal (gel-forming) grade of attapulgite clay, also known as Georgia-Florida fuller's earth, supplied in the form of a powder preferably having particles substantially similar in size to the powdered grains of limestone. Powdered grades of colloidal attapulgite clay are supplied under the registered trademark ATTAGEL. Other binding-type clays, for example gel-forming grades of sepiolite and smectite clays, e.g. bentonite, montmorillonite, hectorite and the like, have chemical stability at temperatures on the order of 800°–1000° C. and may also be employed. These clay binders are also preferably supplied in the form of a powder having particles substantially similar to the powdered grains of limestone. The preferred amount of binder is between 10 and 30% based on the dry weight of the agglomerates. Especially good results were obtained with attapulgite clay at the 15% level wherein the weight of the clay binder minus the free moisture content (unassociated water) was used to arrive at the 15% figure. Mixtures of cementitious clays, understood herein to mean binding-type clays, may also be employed. Auxiliary binders such as magnesium oxysulfate cement, Portland cement, boric acid, sodium silicate and the like, may be used in combination with one or more cementitious clays, or used separately.

Agglomerated particles may be formed by wet agglomeration methods using water as the preferred liquid. Conventional compression-type agglomerating equipment, such as the pin mixer, Sigma blade pug mill, or mix-muller, that provides the squeezing, densifying or compacting action, as opposed to the merely rolling or tumbling action of an agitator-type agglomerator such as a disc, drum or pan agglomerator, gives substantially spherical samples with higher attrition resistance and is preferred for this reason. This distinction in agglomerating equipment is known to those skilled in the art and is described in "CHEMICAL ENGINEER'S HANDBOOK," R. H. Perry and G. H. Chilton, editors, published by McGraw-Hill, New York, 1973. The Turbulator ® agglomerator is particularly preferred. This equipment is described in a paper by J. A. Frye et al, "The Pin-Mixer—A Novel Agglomeration Device," presented at the 1975 International Briquetting Association meeting in Massachusetts on Aug. 14, 1975.

Agglomerated particles are formed by dry-blending the fine particles of pulverized limestone and cementitious binder to form a mixture, adding a volatile liquid (water is preferred) to the mixture in amount adequate to form a mass having a paste-like consistency, and agglomerating the material until particles in the desired size range form and optionally drying the agglomerates. Agglomerates so formed have a smooth, spheroidal shape.

Agglomerated particles thus formed may then be air dried or oven dried and screened to size. The preferred size range of the agglomerates is −6 +60 mesh. This designation −6 +60 mesh is understood herein to mean particles which have passed through the 6 mesh screen, thus −6 mesh, and particles which have been retained on the 60 mesh screen, thus +60 mesh. The particle sizes would range from approximately 0.5 mm to 3.3 mm in diameter. Particles in this size range may be obtained by conventional screening techniques. Agglomerates smaller than 60 mesh (246 microns) would probably be entrained in the flue gas at upward superficial velocities (about 1–3 m./sec.) currently encountered in fluidized bed combustion. Higher velocities would favor use of larger particle size agglomerates.

Agglomerates of the present invention generally have a surface area of between 0.1 and 30 m.$^2$/g. as determined by the standard B.E.T. nitrogen absorption method and have a pore volume in the range of 0.03 to 0.30 cc./g. in the uncalcined state.

In accordance with the major contemplated end use of the agglomerates of the present invention, sulfur dioxide reactivity of the agglomerates can be evaluated by laboratory simulation of the conditions inside an FBC unit. Sorbent particles can be placed in a fixed bed on supports inside a tube or other enclosure; an external furnace can be used to generate temperatures in the neighborhood of the typical operating temperature of a fluidized bed combustor; and simulated flue gas containing sulfur compounds can be passed through the bed. A thermocouple may be used to measure temperature. Gas analysis of the exit stream may be employed to determine the amount of SO$_2$ captured by the sorbent bed as a function of time. Different sorbents can be evaluated in the same apparatus to provide an accurate estimate of relative reactivity. Actual performance in a fluidized bed combustor will refine the quantitative benefit of using agglomerated particles over presently employed, unreformed natural limestone granules.

The relative hardness or resistance to attrition of the agglomerates and of the unreformed limestone granules of the same size can be evaluated by shaking a sample in a canister in rapid, reciprocating motion. Particles shaken in this manner collide with one another and with the walls of the container, thus providing an attrition mechanism similar to that of a fluidized bed. Attrition, measured by percent of original particles passing through a screen of given size (60 mesh is preferred), is evaluated after a suitable interval of time, e.g., several minutes.

The effectiveness of various binders can be evaluated easily by repeating the test using agglomerates formed with different binders. For reasons not presently known, not all high temperature stable binders form bonds strong enough to withstand the mechanism of attrition. Also, some binders possessing the requisite strength, such as silicates, may interfere with the reactivity of the agglomerates when used as the sole or substantially the sole binding agent. The amount of binder affects the attrition resistance also, and may, at the higher levels, interfere with reactivity by reducing the relative amount of available calcium in the sorbent agglomerate.

In accordance with the preferred embodiments of the present invention, the following examples, not to be construed as limiting, are presented.

Limestone agglomerates containing attapulgite binder were prepared by dry-blending 2240 g. of powdered Chemstone limestone having particle size of about 75% finer than 325 Tyler mesh and 470 g. of a gelling grade of attapulgite clay containing 14-16% F.M. (free moisture) and 25% L.O.I. based on total weight ("as is" weight) of the clay, and 1-2% MgO based on dry clay weight. Free moisture was determined by heating a sample to constant weight at 220° F., and L.O.I. was determined by heating to constant weight at 1800° F. A sieve analysis showed about 99+% of the clay sample to be finer than 200 mesh Tyler and 96% finer than 325 mesh Tyler. This blend of material was then placed in a laboratory Sigma-blade pug mill of about 2 gallon capacity, and about 370 g. of water were added to form the paste. The amount of water added may vary, but must be enough to wet the solids thoroughly and less than that required to form a significant supernatant layer of water on top of the mixture. The paste was then transferred to a Turbulator pin-mixer, model 12TB34 obtained from Ferro-Tech Agglomeration Services, Wyandotte, Mich. The Turbulator speed was adjusted to 600 r.p.m. and another 62 g. of water was added intermittently to assist the formation of agglomerates. When it appeared, by visual inspection, that a significant amount of agglomerates in the desired size range ($-14+32$ mesh) had formed, the action of the Turbulator was stopped. The agglomerates were collected, air dried at 300° F. overnight and screened into three fractions: $+14$, $-14+32$, and $-32$ mesh.

Alternatively the dry solids blend and water may be charged directly to the Turbulator, but wetting of the solids is not as efficient with this arrangement as it is with the aforementioned.

For purposes of comparison the procedure was repeated using different binders and other limestones. A control sample was formed in the same way with powdered limestone but containing no binder. These samples were then used for sulfation and attrition tests.

The reactivity of various unreformed limestone granules and sorbent agglomerates was evaluated in a testing unit consisting of a 1-inch I.D. Vycor reaction tube heated to temperature (about 850° C.) by an external tube furnace, a gas metering and mixing system by which simulated flue gas of the desired composition was made and passed upward through the tube, and a gas analysis system (gas chromatograph) by which the concentration of $SO_2$ in the exit gas was measured. The reaction tube contained a section beneath the bed consisting of coarse quartz granules for enhancing the heat transfer to heat the entering flue gas to temperature. Inlet gas contained about 0.3% by volume $SO_2$, 5% $O_2$, 13% $CO_2$ and 81.7% $N_2$. This composition of flue gas (on a dry basis) is roughly equivalent to that obtained during the burning of high sulfur coal, which contains 4-5% sulfur by weight. Gas flow rate ranged from about 920-960 standard cm.$^3$min. for all tests. The reactive bed volume was 8.2 cm.$^3$. The material to be tested was initially at room temperature prior to charging to the preheated reactor. Simultaneous calcination and sulfation reaction followed immediately after charging the room temperature sample of sorbent material to be tested, much in the same manner as fresh sorbent would be charged to a hot, coal-fired FBC boiler.

Samples of particle size range $-14+32$ mesh (0.495 to 1.168 mm) tested in this apparatus included the agglomerates of the present invention and several unreformed natural limestone granules presently used as FBC sulfur sorbents. Capture of sulfur dioxide was measured by continuously monitoring the exit gas $SO_2$ and recording the amounts present as a function of time. The first appearance of $SO_2$ in the exit gas denoted the breakthrough time. From this point on the outlet concentration of $SO_2$ increased with time. The conversion levels, i.e. CaO to $CaSO_4$, were then calculated for individual reactions. The results are shown in Table I.

Data in Table I show reactivity of limestone agglomerates, as measured by percent conversion of calcium to calcium sulfate after five hours, was two to four times that of the unreformed natural limestone granules presently employed to absorb sulfur oxides in fluid bed combustion. In addition, the agglomerates showed no tendency toward lining out, i.e. losing their reactivity by calcium sulfate plugging the pores. At longer reaction times agglomerates of the present invention gave calcium conversion in excess of 60% with no indication of lining out. Based on weight of input sorbent the agglomerates containing 2% boric acid and 15% attapulgite clay were equivalent in performance to the sample containing only the attapulgite clay without boric acid.

Should FBC operation move to higher fluidization velocities, larger particles will be required to prevent entrainment. Agglomerates of the present invention will be even more desirable over unreformed, natural limestone granules, because reactivity of the agglomerates is not greatly affected by particle size. However, the reactivity of unreformed, natural limestone granules would decrease significantly as particle size increased, because the external surface area per unit weight would be reduced. This external surface area is where most of the reaction takes place, giving rise to a sulfation "shell" on the outside of the unreformed, natural limestone granules. By contrast agglomerates of the present invention react with sulfur compounds throughout the particle mass, so that little or no gradient of sulfur concentration exists from the center to the circumference of the agglomerate.

From the calcium conversion data of Table I and a knowledge of the chemical composition of the limestones used, one can show that the agglomerates of the present invention pick up a significant amount of sulfur on a weight basis, i.e., weight sulfur absorbed per input weight of sorbent. For instance, unreformed Greer natural limestone granules line out at about 22% conversion and unreformed Chemstone natural limestone granules line out at about 10% conversion.

TABLE I

REACTIVITY OF LIMESTONE - CONTAINING SORBENTS: % CONVERSION OF CALCIUM TO CALCIUM SULFATE FOR VARIOUS SORBENT MATERIALS

| Time (hours) | Unreformed Grove Natural Limestone Granules | Unreformed Greer Natural Limestone Granules | Unreformed Chemstone Natural Limestone Granules | Chemstone Agglomerates with 4% sodium disilicate | Chemstone Agglomerates with 15% attapulgite clay | Chemstone Agglomerates with 15% attapulgite clay and 2% Boric acid |
|---|---|---|---|---|---|---|
| 1 | 4.6 | 7.2 | 5.5 | 7.9 | 9.0 | 10.3 |

TABLE I-continued

REACTIVITY OF LIMESTONE - CONTAINING SORBENTS: % CONVERSION OF CALCIUM TO CALCIUM SULFATE FOR VARIOUS SORBENT MATERIALS

| Time (hours) | Unreformed Grove Natural Limestone Granules | Unreformed Greer Natural Limestone Granules | Unreformed Chemstone Natural Limestone Granules | Chemstone Agglomerates with 4% sodium disilicate | Chemstone Agglomerates with 15% attapulgite clay | Chemstone Agglomerates with 15% attapulgite clay and 2% Boric acid |
|---|---|---|---|---|---|---|
| 2 | 7.0 | 13.3 | 8.0 | 13.3 | 17.7 | 20.7 |
| 3 | 7.9 | 17.8 | 9.3 | 17.6 | 26.7 | 31.4 |
| 4 | 8.4 | 19.8 | 10.0 | 19.0 | 35.4 | 39.7 |
| 5 | X | 21.6 | X | 20.5 | 42.5 | 46.0 |

"X" Indicates reaction has substantially ceased. Material has lined out.

This is equivalent to a sulfur capture on a weight basis of 0.15 g. $SO_3$/g. input sorbent for the Greer and 0.08 g. $SO_3$/g. sorbent for the Chemstone. This is compared to about 0.28 g. $SO_3$/g. input sorbent for the agglomerates bound with 15% attapulgite after five hours reaction. These agglomerates have not lined out and still have significant absorption capacity left. Weight pickup is important for calculating total weight of sorbent required and hence cost for a particular sulfur removal problem.

In addition, agglomerates of the present invention are capable of absorbing substantially all of the sulfur dioxide in the experimental gas stream for periods many times longer than the crushed, natural limestone granules tested. For example, agglomerates of the present invention showed break-through times on the order of 2–4 hours, while unreformed natural limestone granules showed times on the order of 10–30 minutes when tested under substantially identical conditions of gas flow rate, temperature, and sample volume.

The surprising effectiveness of agglomerated material may be attributed to the increase in porosity or pore volume. Although pre-calcination and salt addition as suggested in the prior art also increase pore volume of unreformed limestones, the maximum reactivity increase is just short of about double depending on the stone. Pore plugging by the sulfated product still limits the reactivity and the ultimate sulfur pickup. For the agglomerates of the present invention the reactivity increase is at least double and may be up to six times as much. The pore volume of agglomerates of the present invention and of unreformed, natural limestone granules was measured by the standard mercury penetration technique, using a Quantachrome Scanning Porosimeter, Model SP-100, from Quantachrome Corporation, Syosset, N.Y., which measures total pore volume of pores ranging from 0.004 to 2.00 microns in diameter. The results are shown in Table II below. Calcined samples were heated at 850° C. for 1½ hours in an atmosphere of 14% $CO_2$ in $N_2$. Particle sizes of all samples were −14+32 Tyler mesh. Pore volumes were measured on the basis of 1 gram of input sorbent for comparison purposes.

TABLE II

PORE VOLUME OF AGGLOMERATES OF THE PRESENT INVENTION BEFORE AND AFTER CALCINATION

| Sample | Pore volume, cc./g. input sorbent | |
|---|---|---|
| | Before Calcination | After Calcination |
| Chemstone agglomerate (no binder) | 0.124 | — |
| Chemstone agglomerate (15% attapulgite) | 0.129 | 0.303 |
| Chemstone agglomerate (15% attapulgite and 2% boric acid) | 0.194 | 0.348 |
| Unreformed Grove limestone granules | 0.008 | 0.193 |
| Unreformed Chemstone limestone granules | 0.005 | — |

Data in Table II show that porosity introduced to the particle by the process of agglomeration according to the present invention is preserved after calcination. This "extra porosity" attributed to the agglomerated structure is approximately equivalent to the porosity introduced as a result of calcination. For example, porosity of Chemstone is increased from 0.005 to 0.124–0.194 cc./g. input sorbent by agglomeration, and porosity increase as a result of calcination is about 0.17 cc./g. input sorbent. Surprisingly the actual performance of agglomerates of the present invention surpasses expectations based on pore volume alone, the reactivity of the agglomerates being from two to four times more reactive, and having ultimate sulfur capacity up to six times that of unreformed natural limestone granules. In fluidized bed combustion, limestone is not precalcined prior to use so that both sulfation and calcination processes occur at the same time, calcination tending to open pores and sulfation tending to plug them. Based on data shown in Table I it appears that agglomerates of the present invention do not exhibit pore-plugging during sulfation. With limestone in agglomerate form, substantially all of the calcium, or at least the major portion thereof, is able to react with sulfur dioxide.

The resistance to attrition of various sorbent agglomerates and unreformed natural limestone granules of similar size was evaluated by shaking a sample in a canister about 2 inches long and 1 inch in diameter using Model 8000 Spex Mixer/Mill ® available from Spex Industries Incorporated, Metuchen, N.J. About 15 cm.³ of test samples of −14+32 mesh particles were weighted and placed in a steel canister. The canister was shaken in the Spex mill for a total of 7 minutes. The sample was then screened to determine the weight of particles in the +60 mesh (246 micron) fraction. Attrition loss was then determined by the percent of original weight lost through the 60 mesh screen. Low weight loss is equated to high attrition resistance. The results of the attrition tests are shown in Table III where uncalcined and calcined samples are compared. Calcined samples were heated to a temperature of 850° C. for 1½ hours in a muffle furnace prior to the attrition test, thereby simulating the effects that heat shock and decomposition of calcium carbonate might have on attrition resistance. The attrition test was run after cooling the calcined samples to room temperature. All samples were unsulfated. The FBC fly ash binder was obtained from a pilot scale FBC unit and had a partial chemical analysis (% by weight) as follows: 17% CaO, 6% $SO_4$, 16% $SiO_2$, 30% C. The calcium sulfate binder was Plaster of Paris, a hydrated salt having the formula $CaSO_4 \cdot \frac{1}{2}H_2O$. The Wyoming bentonite was a commercially available drilling mud grade. The sodium silicate binder was a solution containing about 15% $Na_2O$ and 29% $SiO_2$ by weight.

The data summarized in Table III show that unreformed natural limestone granules have relatively high attrition resistance. Indeed, this is one major reason for their widespread use. Grove limestone is one of the hardest in present use. Limestone agglomerates formed without binder gave unsuitably high weight loss, as did several limestone agglomerates bound with materials such as calcium oxide, calcium sulfate, and FBC fly ash. Clay-type binders, also gave unsuitably high weight loss when used at low levels, but gave excellent performance at higher levels. Especially good results are shown at a level of 15% binder by weight. The sodium silicate binder gave excellent attrition results but poor sulfation performance, as shown previously in Table I. Agglomerates of the present invention are shown to have strength equivalent to the unreformed natural limestone granules presently used in FBC applications and have significantly better sulfur absorption performance.

TABLE III

ATTRITION OF UNREFORMED NATURAL LIMESTONE GRANULES & AGGLOMERATED PARTICLES

| MATERIAL | WEIGHT LOSS (% minus 60 mesh) | |
|---|---|---|
| | Uncalcined | Calcined |
| Chemstone agglomerate (no binder) | 91.8 | 26.9 |
| Chemstone agglomerate (15% FBC fly ash) | 89.8 | 38.6 |
| Chemstone agglomerate (4% attapulgite clay) | 49.9 | 34.3 |
| Chemstone agglomerate (10% calcium sulfate hemihydrate) | 46.2 | 16.7 |
| Chemstone agglomerate (5% CaO, 5% $CaSO_4$) | 31.9 | 47.6 |
| Chemstone agglomerate (8% attapulgite clay) | 28.0 | 8.2 |
| Chemstone agglomerate (10% calcium oxide) | 11.0 | 27.3 |
| Chemstone agglomerate (15% Wyoming bentonite) | 8.2 | 7.1 |
| Grove agglomerate (15% attapulgite) | 6.4 | 6.0 |
| Chemstone agglomerate (15% attapulgite +2% boric acid) | 5.2 | 1.6 |
| Chemstone agglomerate (15% attapulgite) | 3.7 | 2.9 |
| Chemstone agglomerate (15% attapulgite +4% sodium silicate) | 3.1 | 23.8 |
| Unreformed Tymochtee dolomite granules | 3.1 | 50.1 |
| Chemstone agglomerate (4% sodium silicate) | 2.8 | 1.7 |
| Unreformed Grove limestone granules | 1.8 | 3.2 |
| Unreformed Chemstone limestone granules | 1.7 | 5.0 |
| Unreformed Greer limestone granules | 1.2 | 9.3 |

What is claimed is:

1. A method for producing highly attrition resistant limestone agglomerates useful for absorption of sulfur compounds from hot gases which comprises (a) providing naturally occurring, uncalcined limestone in the form of fine grains, (b) mixing into said limestone grains a high-temperature stable, cementitious binder and a volatile liquid to form a mass having a paste-like consistency, (c) agglomerating said mass of paste-like consistency in compression-type agglomerating equipment generating shearing, compacting, densifying and squeezing forces to form essentially spheroidal agglomerates, and (e) optionally drying said agglomerates.

2. The method of claim 1 wherein said agglomerating equipment is selected from the group consisting of pin-mixer sigma-blade pugmill, and mix-muller.

3. The method of claim 1 wherein said volatile liquid is water.

4. Sulfur sorbent agglomerates useful for removing sulfur from combustion gases and reducing gases comprising grains of powdered, naturally occurring, uncalcined limestone, and uniformly mixed therewith grains of a high temperature stable cementitious clay selected from the group consisting of attapulgite, sepiolite, smectite and mixtures thereof in amounts sufficient to bind said limestone grains, said agglomerates having attrition resistance adequate to maintain particle integrity when utilized to remove oxides of sulfur under fluidized bed conditions.

5. The agglomerates of claim 4 wherein said grains of powdered limestone and said grains of cementitious clay binder are both predominantly finer than 200 mesh Tyler.

6. The agglomerates of claim 4 wherein said grains of powdered limestone are predominantly finer than 200 mesh Tyler and at least about 75% finer than 325 mesh Tyler.

7. The agglomerates of claim 4 further characterized by a particle size range finer than about 6 and larger than about 60 mesh Tyler.

8. The agglomerates of claim 4 further characterized by having a surface area of between 0.1 and 30 m.$^2$/g. as determined by standard B.E.T. method using nitrogen absorption, having a pore volume in the range of 0.03 to 0.30 cc./g in the uncalcined state, and being substantially spherical in shape.

9. The agglomerates of claim 4 wherein said cementitious material is present in amount within the range of about 10 to 30% based on dry weight of said agglomerates.

10. The agglomerates of claim 4 wherein the grains of powdered limestone are predominantly finer than 200 mesh Tyler, the size of the agglomerate is in the range of about 6 to 60 mesh Tyler, the cementitious clay selected from the group consisting of attapulgite, sepiolite, smectite and mixtures thereof in amounts ranging from about 10 to 30% based on the dry weight of the agglomerates, and said agglomerates are further characterized by having a surface area of between about 0.1 and 30 m.$^2$/g. as determined by standard B.E.T. method using nitrogen absorption and a pore volume in the range of 0.03 to 0.30 cc./g.

* * * * *